US008427242B2

(12) United States Patent
Raphaeli et al.

(10) Patent No.: US 8,427,242 B2
(45) Date of Patent: Apr. 23, 2013

(54) ULTRA WIDEBAND ON-CHIP PULSE GENERATOR

(75) Inventors: Dani Raphaeli, Kfar Saba (IL); Guy Shasha, Or-Yehuda (IL)

(73) Assignee: Zebra Enterprises Solutions Corp., Oakland, CA (US)

( * ) Notice: Subject to any disclaimer, the term of this patent is extended or adjusted under 35 U.S.C. 154(b) by 902 days.

(21) Appl. No.: 12/354,108

(22) Filed: Jan. 15, 2009

(65) Prior Publication Data
US 2010/0177803 A1    Jul. 15, 2010

(51) Int. Cl.
*H03L 7/085*    (2006.01)
(52) U.S. Cl.
USPC ............. 331/1 A; 331/173; 331/74; 331/172; 341/157; 375/242; 375/146; 375/295; 332/103; 332/106
(58) Field of Classification Search ............ 331/1 A, 331/172, 173, 74; 341/157; 375/242, 146, 375/295; 332/103, 106
See application file for complete search history.

(56) References Cited

U.S. PATENT DOCUMENTS

| | | | |
|---|---|---|---|
| 3,649,918 A | 3/1972 | Freedman et al. | |
| 4,873,499 A | 10/1989 | Algor | |
| 5,274,271 A | 12/1993 | McEwan | |
| 6,433,720 B1 | 8/2002 | Libove et al. | |
| 6,586,999 B2 | 7/2003 | Richley | |
| 7,965,150 B2 * | 6/2011 | Kobayashi et al. | 331/185 |
| 2005/0179503 A1 * | 8/2005 | Shadwell | 331/185 |
| 2006/0039448 A1 | 2/2006 | Ryckaert | |

FOREIGN PATENT DOCUMENTS
WO    WO03098528    11/2003

OTHER PUBLICATIONS http://www.eecs.berkeley.edu/Pubs/TechRpts/2006/EECS-2006-136.pdf.

* cited by examiner

*Primary Examiner* — Arnold Kinkead
(74) *Attorney, Agent, or Firm* — Alston & Bird LLP

(57) ABSTRACT

A method for generating an UWB pulses based on LC oscillator topology. Fast turn on of the oscillator is achieved by creating large asymmetry in a normally symmetrical topology which is used in a typical differential type oscillator. One method for achieving large asymmetry is activating one branch of a differential pair of branches for a short duration before activating both branches in a normal operation. The bandwidth of the pulse is controlled by modifying the duration of the oscillator activation. Fast turn on and turn off is essential for high bandwidth generation. The method is adaptable for generating binary phase shift keying (BPSK) modulation. Selecting the activated branch of a fully symmetrical topology controls the output phase and creates two possibilities which differ exactly by 180 degrees. In a preferred embodiment, all the pulse generator components are on-clip leading to a low cost solution. The circuit can generate high power pulses directly on a load. It is also an option to add an amplifier to drive the output and separate the load from the oscillator. This method generate high power, stable pulses under varying practical conditions like process changes, VDD changes and temperature changes.

26 Claims, 13 Drawing Sheets

ULTRA WIDEBAND ON-CHIP PULSE GENERATOR

FIELD AND BACKGROUND OF THE INVENTION

The present invention relates to impulse radio type Ultra-Wideband (UWB) communication systems and, in particular, it concerns a method and device for generating a very short and high power bandpass pulse with low power consumption, with an inherent capability for binary phase shift keying (BPSK) modulation.

Ultra-wideband (UWB) communication is an attractive technology for personal and local wireless networks. Instead of transmitting and receiving continuous modulated sinusoidal waveforms as in carrier-based systems, impulse radio type UWB communication systems transmits short pulses with gaps of no energy between them. Such pulses are designed to occupy wide bandwidth, up to several GHz of spectrum.

For UWB systems occupying a large portion of the 3.1 GHz to 10.6 GHz band allowed by the Federal Communications Commission (FCC) rules a pulse width of 50-100 ps would be required. Other UWB systems using narrower spectrum, but still within the minimum bandwidth requirements of the FCC, would require longer pulses but still in duration of less than 1-2 ns. The wide bandwidth in turn allows a low power spectral density for a given transmission power, leading to the claim that it will not interfere with other users of that band.

Some (but not all) advantages of UWB technology are:
1. UWB provides a wide bandwidth signal more simply than other techniques.
2. Self interference in a UWB network is very low, allowing a large number of UWB terminals to operate in a given area.
3. The use of narrow pulses makes UWB very tolerant to multipath use.
4. UWB can provide accurate range information between a transmitter and a receiver, even down to a few centimeters.

In some UWB systems, like those described in patents application WO 2003/098528 entitled METHOD AND SYSTEM FOR DISTANCE DETERMINATION OF RF TAGS, the UWB pulses are organized in short bursts of relatively close pulses, i.e. about 10 ns between pulses, modulated with a Barker sequence.

The use of a burst of pulses allows a reduction in the pulse peak power, however relatively large pulses may still be required to achieve a decent power while at the same time conforming to the FCC UWB limits.

One technical difficulty to solve when designing UWB devices is how to generate high power pulses of short duration under the constraint of low power consumption from the power supply.

Prior art systems for generating pulses are known and there are many possible methods to generate UWB pulses. One method is a pulsed oscillator. In this method there is an oscillator with fast turn on and turn off times, and the output of this oscillator is the desired pulse, which can be further amplified or upconverted if necessary.

Traditional LC oscillator topology includes a reference current that creates high gain in the active device in order to obtain oscillation conditions. When these conditions are obtained, stable oscillations are generated. One method for generating a pulsed oscillator is describe in the article found at Webpage [http://www.eecs.berkeley.edu/Pubs/TechRpts/2006/EECS-2006-136.pdf]

In this method, turning on and off the reference current will turn the oscillation on and off such that a pulse is generated. A drawback of this method is that the turn on and off times of the oscillator are high, so wide bandwidth pulses necessary for UWB cannot be achieved. Fast turn on and off is achieved by a switch that shortcuts the inductor, and when the switch is released, the oscillation starts. When the switch is closed, the oscillations decay. In order to create fast start up of the oscillations, reset switches short the outputs temporarily to two different voltages (e.g. one to VDD and other to ground (GND)). This reset circuit should operate for a very short time, less than half a cycle, to avoid reducing the Q of the tank and disturbing the oscillation condition. Generating such short pulses (on the order of 100 ps) with the load of large switch transistors is a technological challenge.

In another method described in US Patent Application No. 2006/0039448 A1, a baseband pulse is generated by a ring oscillator topology and then the baseband pulse is upconverted by mixing with a continuously working oscillator generating the radio frequency (RF) frequency. This method has disadvantages of high power consumption and low output power.

In U.S. Pat. No. 3,649,918, a high Q cavity resonator is used in order to achieve oscillations in high energy. A short pulse is obtained by connecting the oscillator to the load by a switch for a short duration. The disadvantage of such approach is that the oscillator is consuming high power for a long duration, much longer than the needed pulse. In addition, a high Q resonator is required, which is not available in current Very-large-scale integration (VLSI) technology, so expensive external devices would be necessary.

Other methods to generate RE pulses do not rely on a pulsed oscillator. In U.S. Pat. No. 4,873,499, the pulse is generated by a step recovery diode (SRD) connected to the base of a transistor, which generates a fast rising electrical voltage step that is then converted into an impulse by one or more capacitors, which differentiate the step. The transistor is also driving a resonant circuit that generates the pulse. Design with a SRD diode suffers from variations in pulse position with temperature, and it also has a drawback of low output power.

Another requirement for a UWB pulser is an ability to control the pulse duration, hence its bandwidth. The operating frequency of systems is increasing due to technological improvements, so the need for narrower or "ultra fast" circuits is important.

Representative prior methods for controlling the pulse duration include U.S. Pat. No. 6,433,720, which describes the pulse duration being determined by the level of the control signal. This is achieved by level-activated switching elements, which can be transistors or diodes.

However, for VLSI implementation, using Gallium arsenide (GaAs) technology is much more expensive than utilizing Complimentary Metal Oxide Semiconductor (CMOS) technology.

Other pertinent prior systems include U.S. Pat. No. 5,274,271, which describes a narrow and high power pulse that is generated by a nonlinear transmission line with series inductors and variable capacitors coupled to ground made from reverse biased diodes. This method is implemented by discrete components and requires a sophisticated board design (because of high power level 100 kW) so it is more expensive than the device of the present invention. In addition the short pulses are generated by optimizing the length of the nonlinear transmission line. This is more complicated than the present invention. Also, the pulse repetition rate is limited mainly by the speed of the driver circuit.

In other systems, like U.S. Pat. No. 6,586,999, a low power pulse generator is amplified by a high power amplifier, but this power amplifier is turned on for about the duration of the transmitted pulse to save power consumption. Disadvantages of this method include using a high power amplifier that often demands a driver amplifier so additional current and chip size are needed. Further, there is no ability to control turning on the amplifier with the transmitted pulse. Therefore, the amplifier will open and close some time before and after the transmitted pulse which requires more current consumption. In the device of the present invention, there is an optional class C amplifier 103, therefore, there is no current consumption until there is a high signal level at the input.

There is therefore a need for a method and device for generating a very short and high power bandpass pulse with low power consumption.

SUMMARY OF THE INVENTION

The present invention is a method and device for generating a very short and high power bandpass pulse with low power consumption.

According to the teachings of the present invention there is provided, a method for producing a high power Radio Frequency pulse for a very short duration, the method comprising: (a) providing an oscillator having a symmetric topology; (b) activating a first branch of a differential pair of branches of the symmetric topology for a short duration so as to break circuit symmetry and thereby create a large asymmetry in initial voltages; (c) activating a second branch of the symmetric topology to begin oscillations; and (d) deactivating at least one of the first branch and the second branch to terminate oscillations.

According to a further teaching of the present invention, the oscillator is implemented having a cross coupled oscillator topology.

According to a further teaching of the present invention, at least one of the activating the first branch and the activating the second branch includes closing at least one switch associated with at least one of the first branch and the second branch.

According to a further teaching of the present invention, the deactivating includes opening at least one the switch associated with at least one of the first branch and the second branch.

According to a further teaching of the present invention, there is also provided controlling a bandwidth of the Radio Frequency pulse by modifying a duration of oscillator activation.

According to a further teaching of the present invention, there is also provided providing at least one inductor and at least one capacitor such that the oscillator is based on resonance of the at least one inductor and the at least one capacitor.

According to a further teaching of the present invention, the at least one capacitor is implemented as a parasitic capacitor.

According to a further teaching of the present invention, the inductor is implemented using chip bond-wires.

According to a further teaching of the present invention, there is also provided selecting on which one of the first branch and the second branch to create the asymmetry and thereby allow for bi-phase modulation.

According to a further teaching of the present invention, there is also provided consuming power only for a duration of the Radio Frequency pulse, which is achieved by not using a reference current to operate the oscillator.

According to a further teaching of the present invention, there is also provided implementing all components in a single VLSI circuit.

There is also provided according to the teachings of the present invention, a high power Radio Frequency pulse generator for generating a high power Radio Frequency pulse for a very short duration, the pulse generator comprising: (a) an oscillator having a symmetric topology; (b) at least a first switch configured in a first branch of a differential pair of branches of the symmetric topology; and (c) at least a second switch configured in a second branch of the differential pair of branches of the symmetric topology; wherein closure of one of the first and the second switches breaks a circuit symmetry of the symmetric topology so as to create an asymmetry in initial voltages of the differential pair of branches and subsequent closure of another of the first and the second switches begins oscillations and opening of at least one of the first and the second switches terminates oscillations.

According to a further teaching of the present invention, the oscillator has a cross coupled oscillator topology.

According to a further teaching of the present invention, the first branch of the cross coupled topology includes at least a first transistor and the second branch of the cross coupled topology includes at least a second transistor and the first switch connects a gate of the first transistor to a drain of the second transistor and the second switch connects a gate of the second transistor to a drain of the first transistor and a third switch connects the gate of the first transistor to ground and a fourth switch connects the gate of the second transistor to ground.

According to a further teaching of the present invention, the first branch of the cross coupled topology includes at least a first transistor and the second branch of the cross coupled topology includes at least a second transistor and the first switch connects a source of the first transistor to ground and the second switch connects a source of the second transistor to ground.

According to a further teaching of the present invention, there is also provided two optional bypass capacitors that short the first switch and the second switch.

According to a further teaching of the present invention, there is also provided a third switch that connects the sources of the first switch and the second switch to ground.

According to a further teaching of the present invention, the pulse generator is configured to operate by relying on mutual inductance between two branches of the inductor.

According to a further teaching of the present invention, there is also provided a control unit configured for controlling a bandwidth of the Radio Frequency pulse by modifying a duration of oscillator activation.

According to a further teaching of the present invention, there is also provided at least one inductor and at least one capacitor such that the oscillator is based on resonance of the at least one inductor and the at least one capacitor.

According to a further teaching of the present invention, the at least one capacitor is a parasitic capacitor.

According to a further teaching of the present invention, the inductor uses chip bond-wires.

According to a further teaching of the present invention, there is also provided a mechanism configured for selecting on which one of the first branch and the second branch to create the asymmetry and thereby allow for bi-phase modulation.

According to a further teaching of the present invention, no reference current is used to operate the oscillator, therefore, power is consumed only for a duration of the Radio Frequency pulse.

According to a further teaching of the present invention, all components are included in a single VLSI circuit.

BRIEF DESCRIPTION OF THE DRAWINGS

The invention is herein described, by way of example only, with reference to the accompanying drawings, wherein:

FIGS. 5 and 6 are waveform diagrams illustrating the operation of a pulse generator of the present invention over time, in which FIG. 6 is a detail of FIG. 5;

DESCRIPTION OF THE PREFERRED EMBODIMENTS

Figure 1:
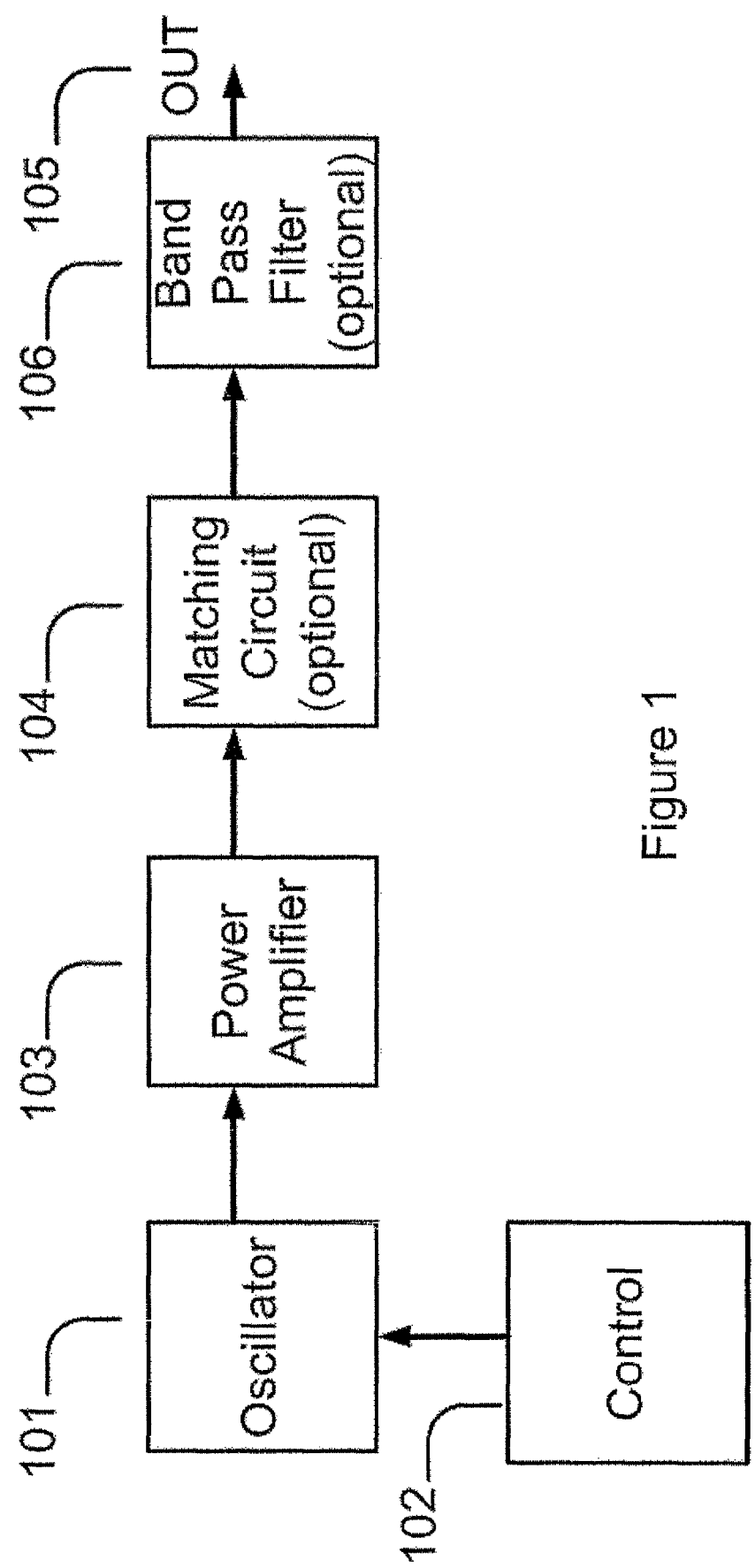
FIG. 1 is a block diagram of a pulser constructed and operational according to the teachings of the present invention.

The present invention is a pulse generator and a method for generating a very short and high power bandpass pulse with low power consumption.

The principles and operation of a pulse generator and method for generating a very short and high power bandpass pulse with low power consumption according to the present invention may be better understood with reference to the drawings and the accompanying description.

By way of introduction, the present invention discloses a pulse generator and method for generating a very short and high power bandpass pulse with low power consumption, with an inherent capability for BPSK modulation. As used herein, very short pulses are in the order of 1 nsec and a high power pulse is in the order of +20 dBm.

The present invention is based on LC (L is an inductor and C is a capacitor) oscillator topology and includes a number of novel features that when combined work in synthesis to generate a very short and high power RF pulse with low power consumption. These novel features include fast turn on of the oscillator, which is achieved by creating large voltage asymmetry in a normally symmetrical topology as is used in a typical differential type oscillator. The creation of the voltage asymmetry constitutes a "startup" phase of the present invention.

The present invention also allows for a very simple way of generating BPSK modulation.

Further, the present invention activates a high power oscillator for a very short duration, while consuming power only for the duration of the pulse, by non-limiting example, generating a pulse of about +20 dBm for duration of less 1 nsec. Since the oscillator output is high, a class C amplifier is used, which conserves power consumption.

In the present invention, since the oscillator consumes power only when the switches that activate it are closed, no reference current is needed in order to operate the oscillator, thereby eliminating the need for generating a reference current, which also lowers power consumption, and operating the oscillator at the highest power level as possible.

Controlling the pulse duration, hence its bandwidth, is easy achieved in the present invention by closing and opening switches and controlling the duration of oscillator operation.

The present invention may be implemented as an RF Integrated Circuit (RFIC), in which all the pulse generator components are integral to the chip, thereby lowering costs of manufacture and installation.

The device of the present invention is very robust and operates well in diverse conditions of Process changes, VDD changes and Temperature changes (PVT).

A fast turn on time is achieved by using switches that break the circuit symmetry during a startup phase creating large asymmetry in the initial voltages. After the short startup phase, other switches are closed for normal oscillator operation. The same switches or additional ones are used for fast stopping of the oscillations by opening and turning off the oscillator. Using low resistance switches leads to very fast charging of the capacitances needed for creating the large voltage difference needed for the fast startup.

Controlling the pulse duration, hence its bandwidth is easy in the present invention The timing of the switches controls the width of the pulse. The necessary control signals are very easy to generate by a simple digital timing circuit based on an R-C delay. The timing circuit further includes a digital control of the pulse duration by use of a control word as will be discussed below.

Still another important feature of the present invention is the ability to accurately control the oscillation phase between two options separated by 180 degrees, allowing BPSK, or generating a Barker code composed of several bipolar pulses. The polarity control is simply achieved by selecting the polarity of the asymmetry in the initial startup conditions in the otherwise symmetric structure. This is achieved, by non-limiting example, by selecting which side of the oscillator will have its switches activated in the startup phase.

The duration of the startup phase should be approximately equal to half an oscillation cycle for best operation. However, the design is not sensitive to the exact timing, and simple and inaccurate timing circuits can generate the required control signals. A preferred embodiment of the present invention will have the startup phase implemented using the same switches that turn on the oscillations. In such embodiment the startup phase begins when the switch, or switches, on one side of the oscillator is closed so that one branch of the oscillator circuitry is connected. Normal operation of the oscillator occurs when the switch, or switches, on both sides of the oscillator are closed and both branches of the oscillator circuitry are connected. Thus the time at which each of the switches close is all that differentiates between the startup phase and normal operation of the oscillator. Since the control signals to the switches are simply a delayed version of a reference pulse, their generation is very simple. It should be noted that no very short duration pulse to the switch is necessary for the duration of the startup phase, merely a delay between the control signals will do the job.

The frequency of the oscillator is determined by the value of the inductor and the capacitors, some of which may be of parasitic capacitance. Tuning of the oscillator frequency, if needed, can be achieved through a few bits of binary signal in a weighted switched capacitor array.

Turning now to the drawings, FIG. 1 illustrates a block diagram of a preferred embodiment of an overall system of the present invention that includes:

a. A digital control circuit 102 that generates control signals.

b. A pulsed oscillator circuit 101 c. Power amplifier 103 (optional).

d. Impedance matching circuit 104 (optional) and band pass filter (BPF) 106 (optional) in order to match the output to the antenna for highest power and meeting regulations.

Figure 2:
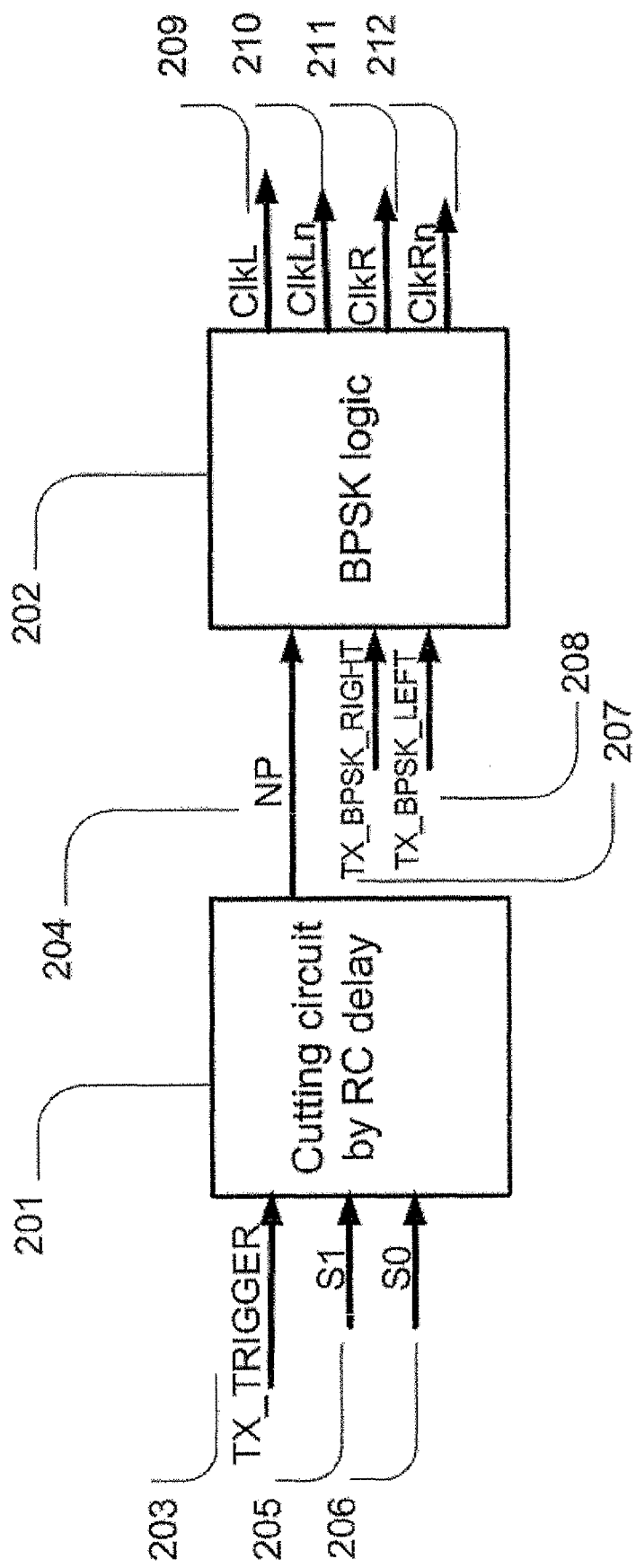
FIG. 2 is a block diagram of the control logic for a pulser constructed and operational according to the teachings of the present invention.
Figure 3:
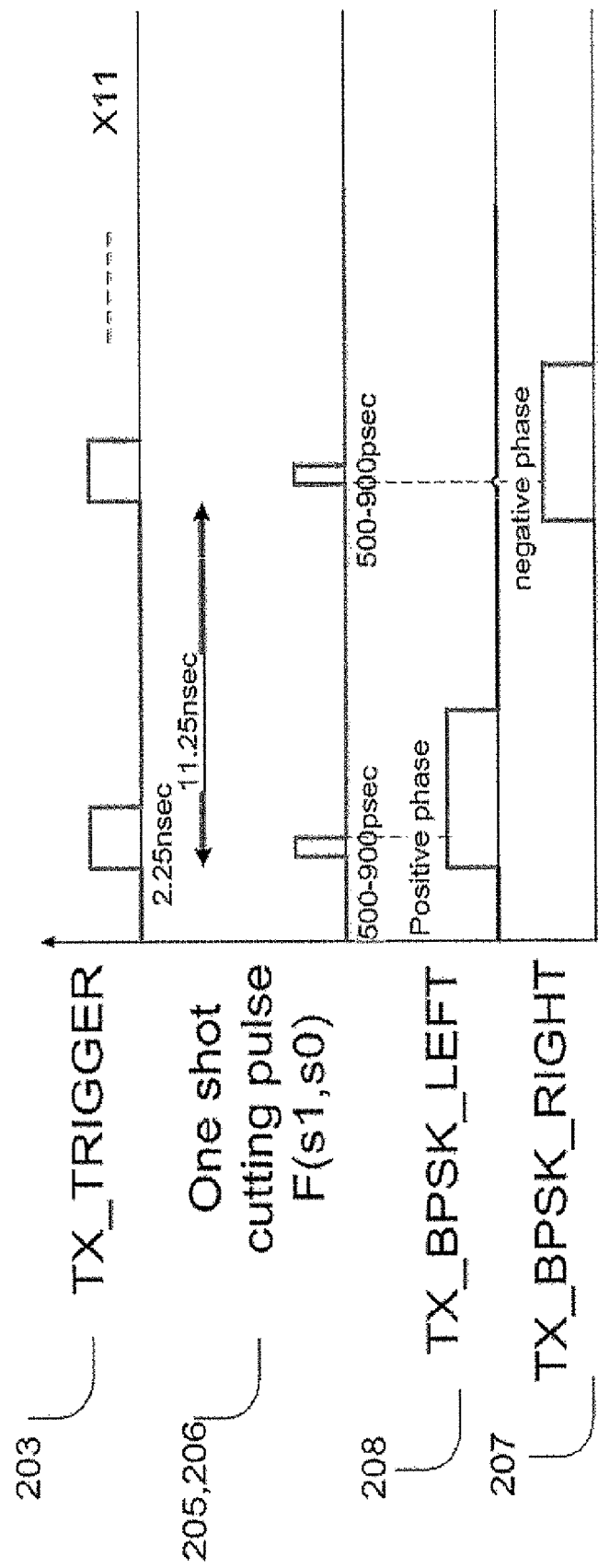
FIG. 3 is a diagram illustrating a preferred pulse timing for a pulse generator constructed and operational according to the teachings of the present invention.

FIG. 2 illustrates a preferred embodiment of the digital control 102, which will be discussed with relation to the waveform diagram of FIG. 3 illustrating the operation of the pulsed oscillator of the present invention.

A reference pulse transmit trigger (TX_TRIGGER) 203 of relatively large duration is differentiated to generate a narrow pulse (NP) 204 which its length is set according to a given control word "S" 205, 206. NP 204 is logically combined with transmit binary phase shift keying right control signal (TX_BPSK_RIGHT 207) and transmit binary phase shift keying left (TX_BPSK_LEFT 208) control signal that are used to determine the output pulse polarity.

Figure 4:
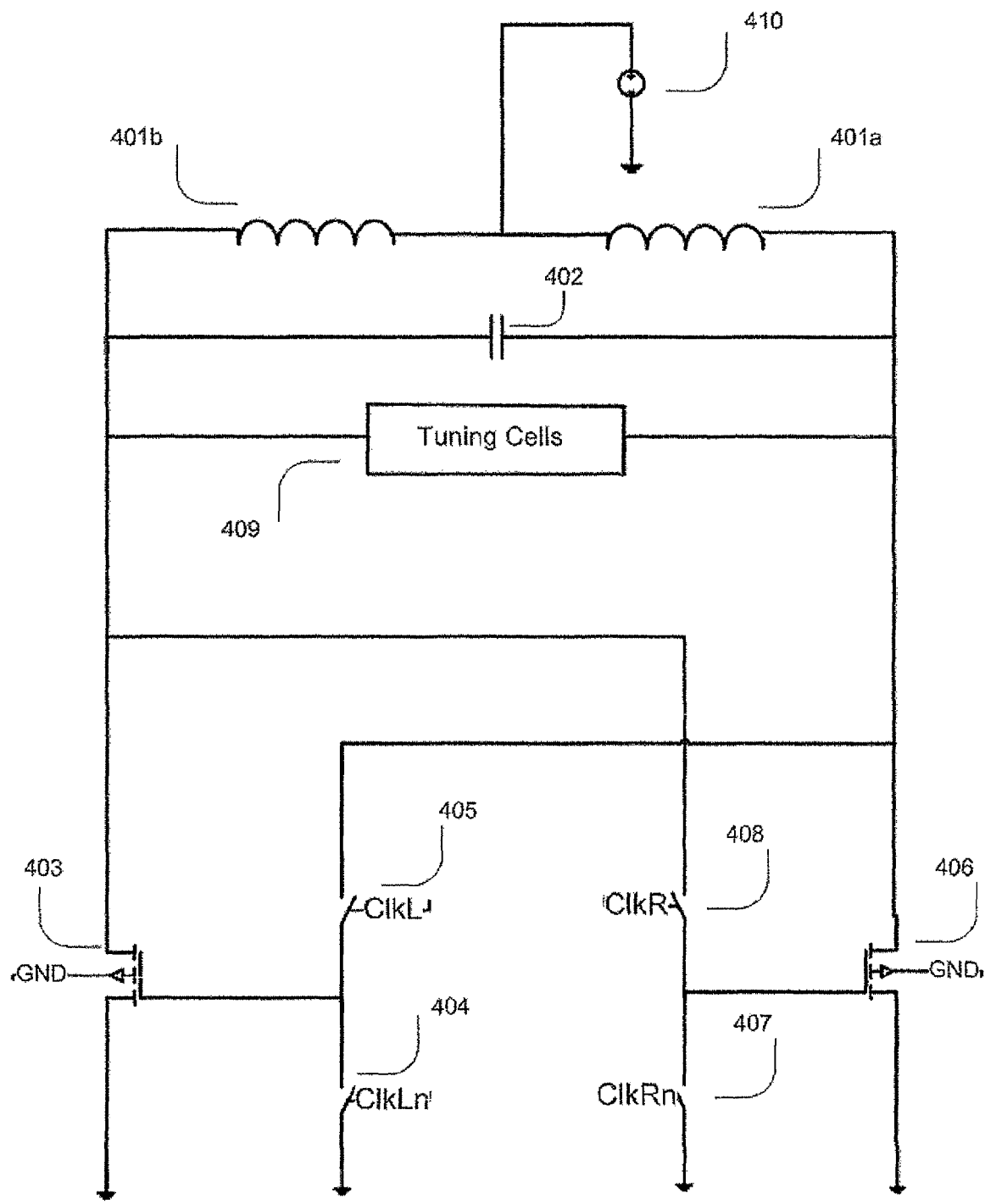
FIG. 4 is a schematic diagram of a preferred embodiment of a pulse generator constructed and operational according to the teachings of the present invention.
Figure 5:
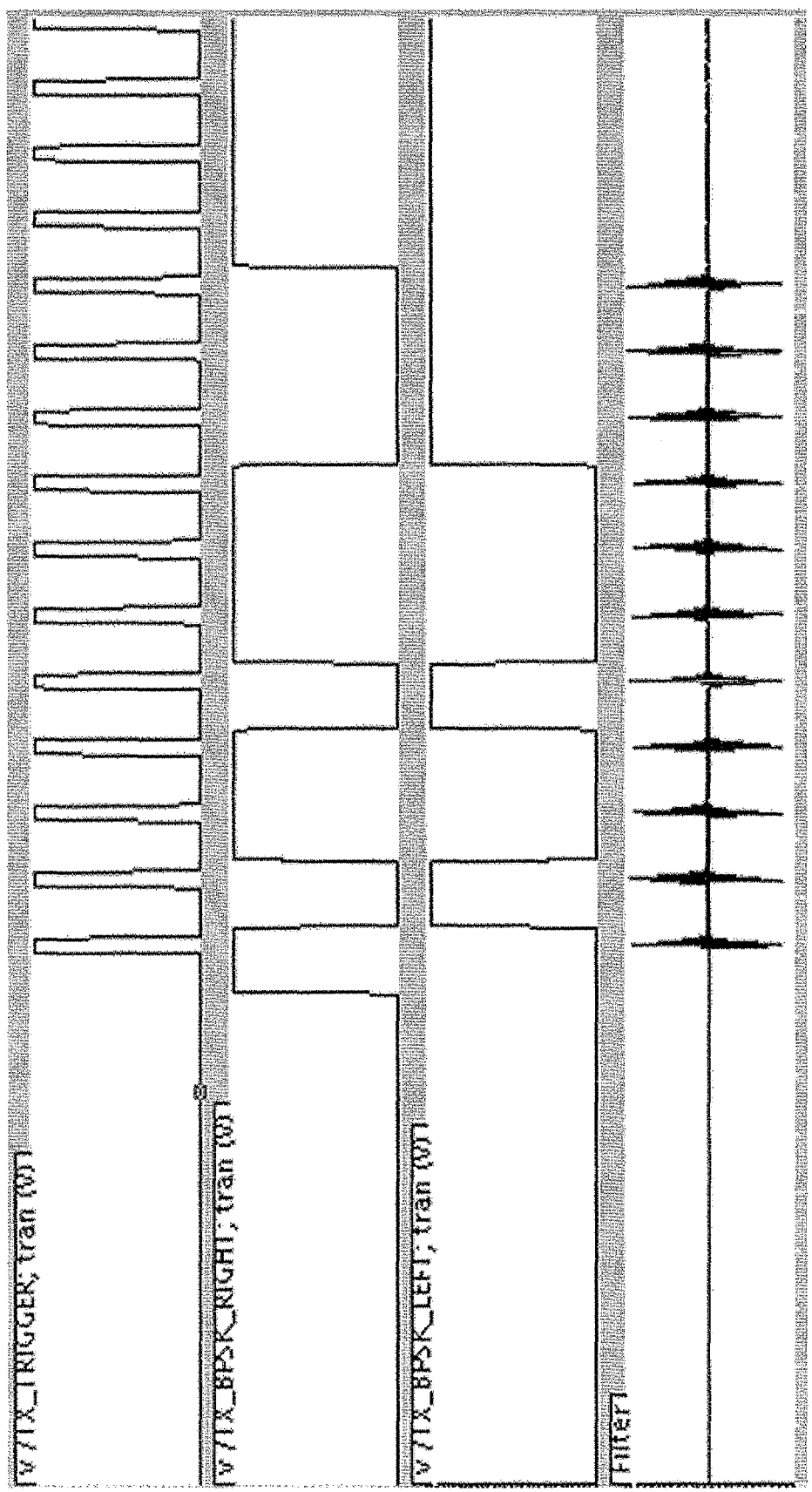
Figure 6:
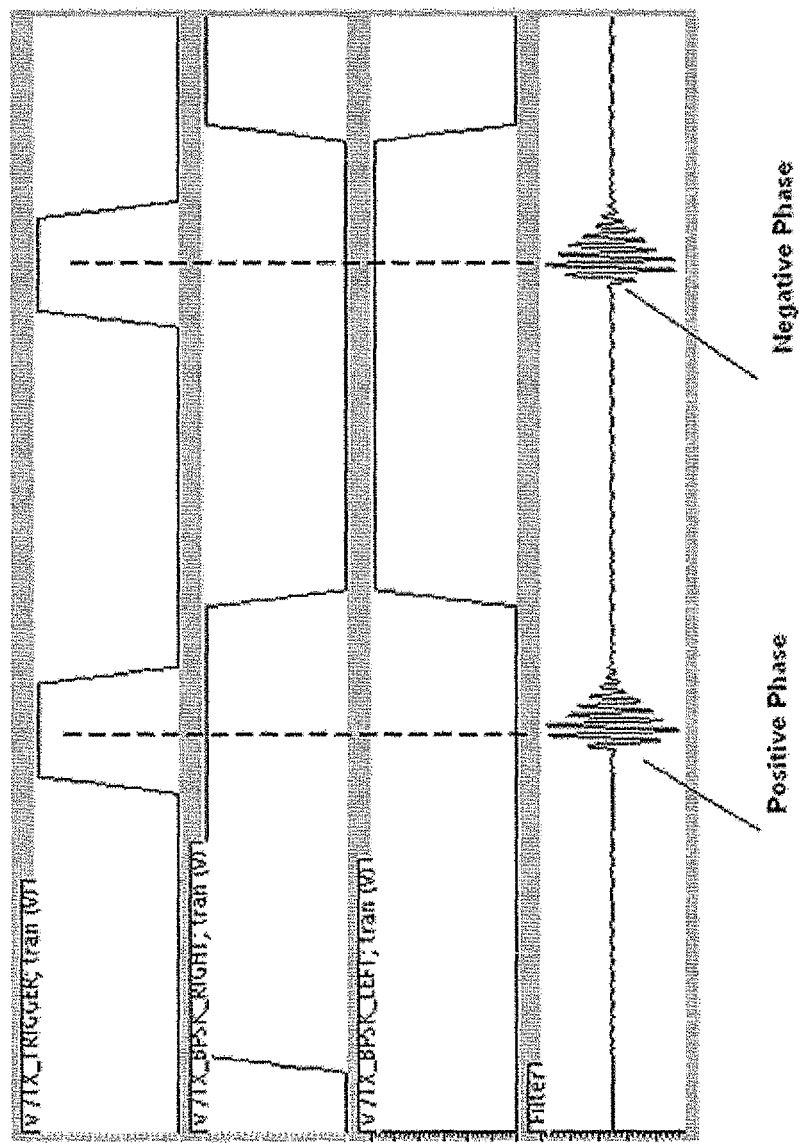
Figure 7:
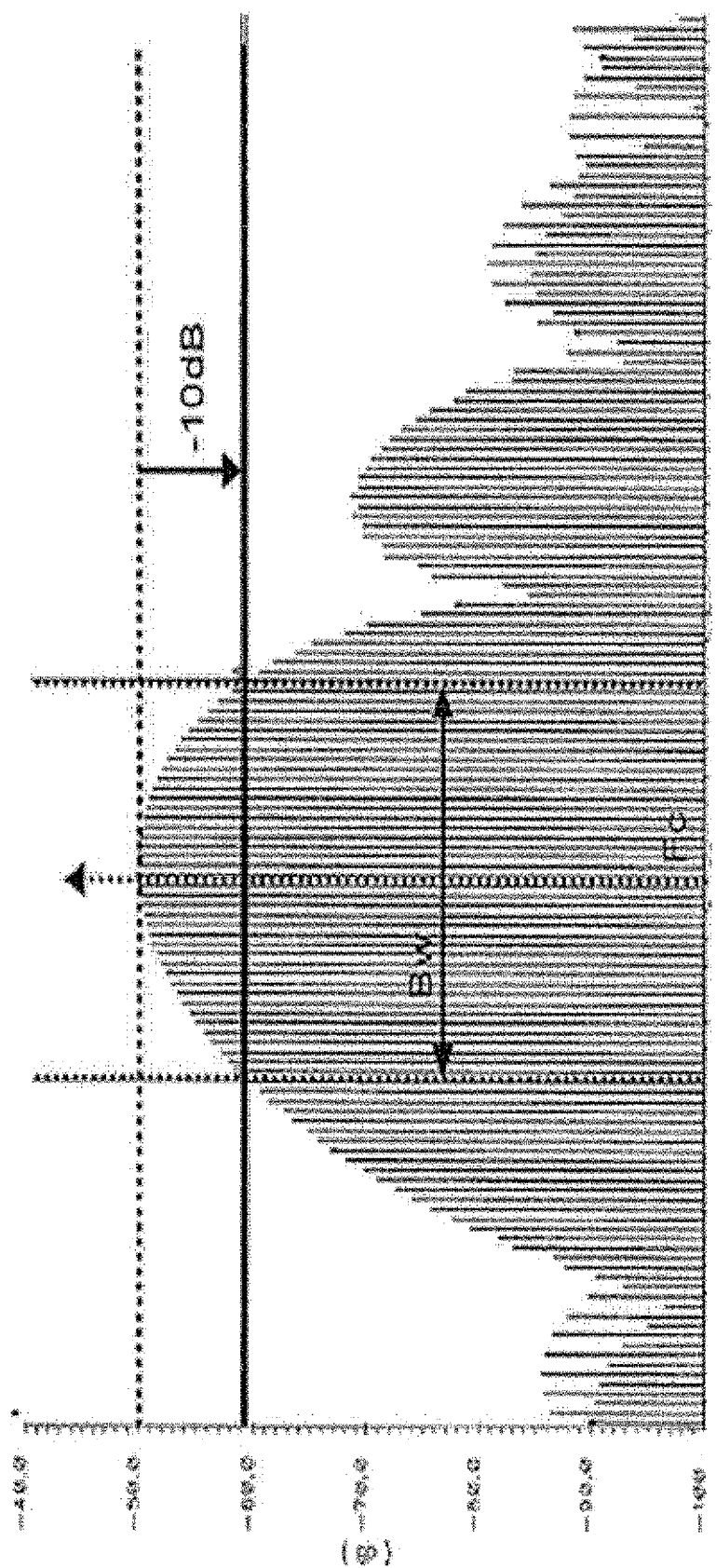
FIG. 7 is a graph depicting spectrum specification definitions and illustrates the pulse generator wave frequency within that spectrum.
Figure 8:
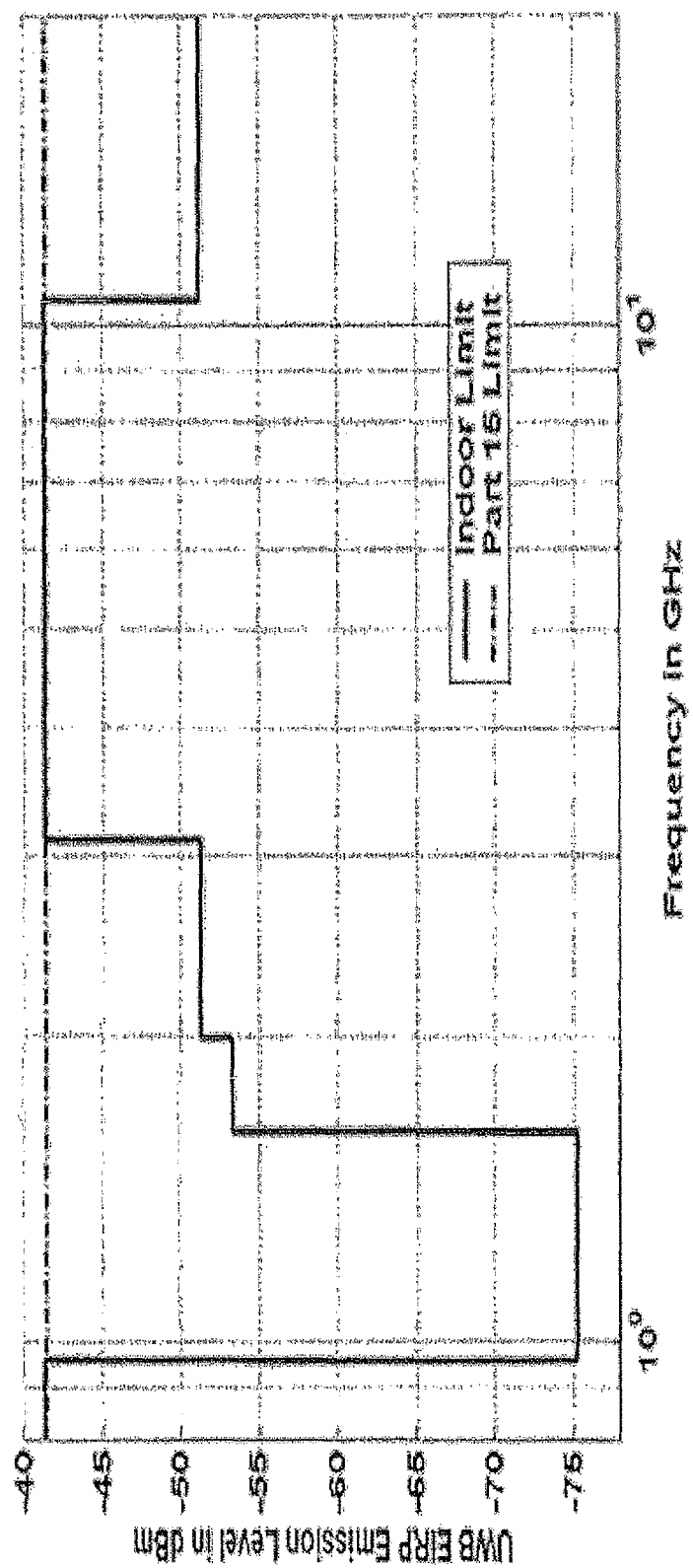
FIG. 8 is a graph depicting spectrum requirements of UWB devices due to regulations.

The control logic creates clock left n (ClkLn) 210, clock left (ClkL) 209, clock right n (ClkRn) 212 and clock right (ClkR) 212 pulses that determine which switch will be closed in the pulsed oscillator circuit (see FIG. 4).

Power amplifier 103 is a cascode amplifier which increases the signal power and isolate pulse oscillator 101 from output impedance changes.

Matching circuit 104 insures that out put from power amplifier 103 will be stable, match antenna impedance and that the design meets the FCC requirements.

FIG. 4 schematically illustrates the main components of the pulse oscillator 101 according to the teaching of the present invention.

Inductor 401, capacitor 402, tuning cell 409 and additional parasitic capacitances (not shown) determine the center frequency of the oscillator 101.

Tuning cell 409 is used to change the center frequency if the frequency is shifted due to temperature or process variations, for example.

Transistors 403 and 406 are connected in cross couple topology to create an oscillator circuit as is currently known in the art.

It should be noted that all of the switches illustrated in the drawings are preferably implemented as n-type metal-oxide-semiconductor (NMOS) type, in which a control level of logical "1" is closed and "0" is open.

Figure 11:
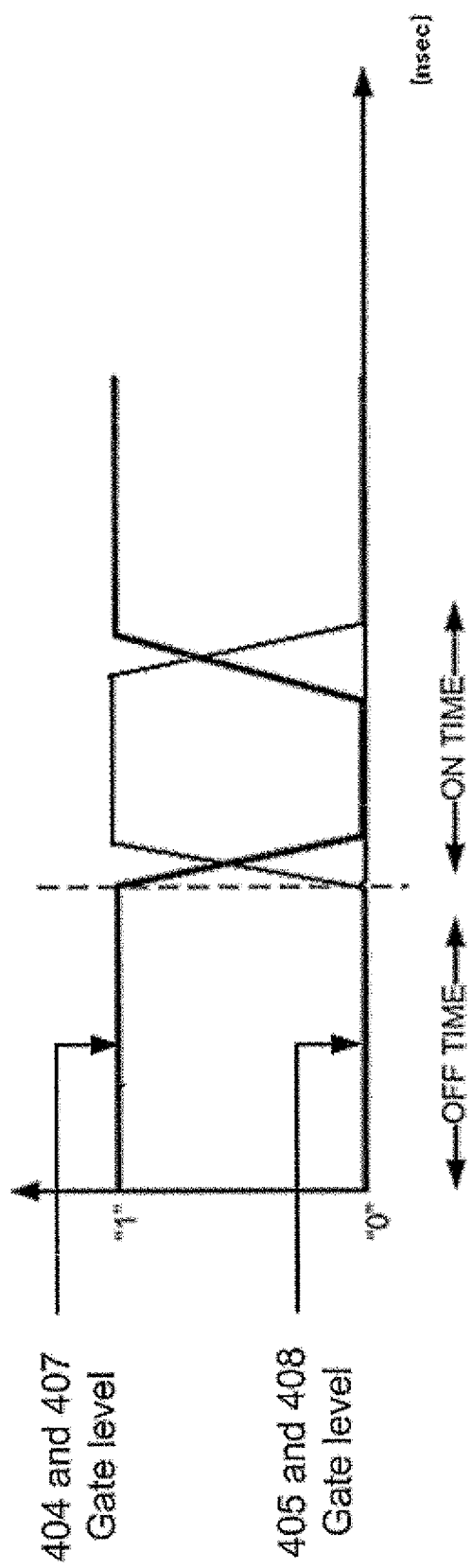
FIG. 11 is a diagram illustrating CNT levels of pulse generator switches according to the teachings of the present invention.

When the oscillator 101 is off, or reset state, switches 405 and 408 are open and 404 and 407 are closed, see FIG. 11. The voltage level at the gate of transistors 403 and 405 is zero so no current is flowing.

The output pulses are generated by operating switches 405 and 407 or 404 and 408 according to their controls respective ClkLn 210, ClkL 209, ClkRn 212 and ClkR 212. Diagrams of waves generated by the operation of switches 404, 405, 407 and 408 are illustrated in FIGS. 3, 5, 6 and 11.

The phase of the oscillation is determined by the start-up phase in which only one branch of the oscillator 101 is activated and the opposite branch is connected to GND.

The phase of the output pulses is determined by a logical combination of NP 204 and TX_BPSK_RIGHT 207 and TX_BPSK_LEFT 208 controls.

Figure 12:
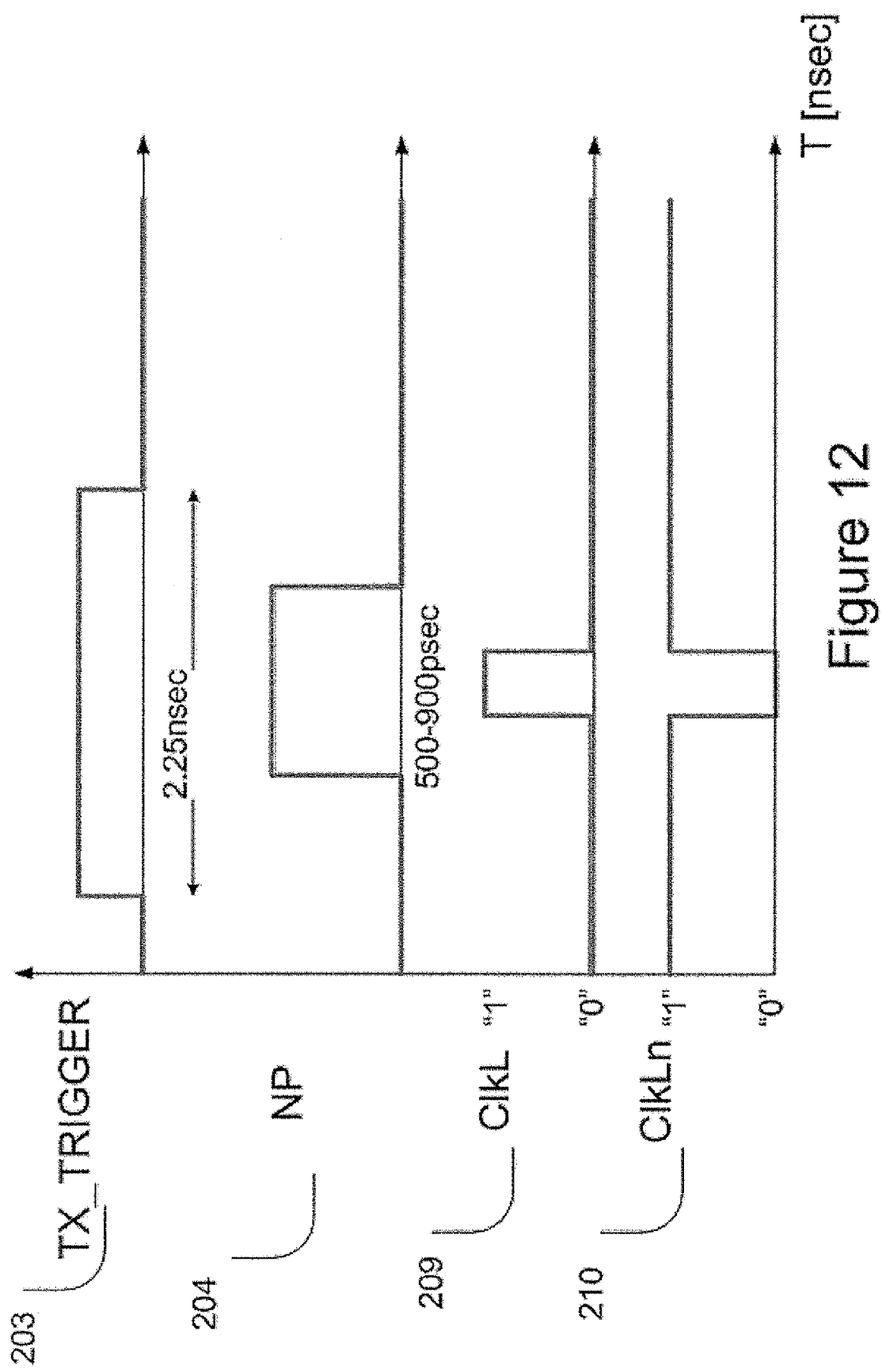
FIG. 12 is a diagram illustrating the time intervals of the Digital control of FIG. 1.

If TX_BPSK_LEFT 208 is "1", ClkL 209 will be active in the startup phase and if TX_BPSK_RIGHT 207 is "1", ClkR 211 will be active in the startup phase. To start the pulse, TX_TRIGGER 203 rises, and the digital control 102 generates the signal NP 204 which in turn generates ClkLn 210, ClkL 209, ClkRn 212 and ClkR 212 in the right polarity and the startup phase begins. FIG. 12 illustrates be wave diagram of the output of digital control 102.

For illustration purposes solely, with no limitation to the scope of the present invention intended, we will describe operation of the circuit of FIG. 4 assuming TX_BPSK_LEFT 208 is "1". During the startup phase switch 405 closes and 404 opens, so voltage level at gate of 403 starts to increase as a beginning of the first cycle of the oscillations. After a delay time that is approximately equal to half an oscillation cycle the voltage at 403 reaches a maximum level. At this time, the digital control 102 enters the full power state, in which ClkR 211 is raised to "1" so as to close switch 408 and ClkRn 212 is set to "0" to open switch 407. This setting of the switches effectively creates a well connected cross coupled oscillator, which operates at the highest power possible.

In order to terminate the RF pulse NP 204, the digital control 102 issues the control signals to end the pulse by setting both ClkL 209 and ClkR 211 to "0" and ClkLn 210 and ClkRn 212 to "1". This setting not only cuts the connections that allows the cross coupling, but also brings the gates of the transistors 403 and 406 to zero voltage as fast as possible to bring them to an off condition.

Figure 9:
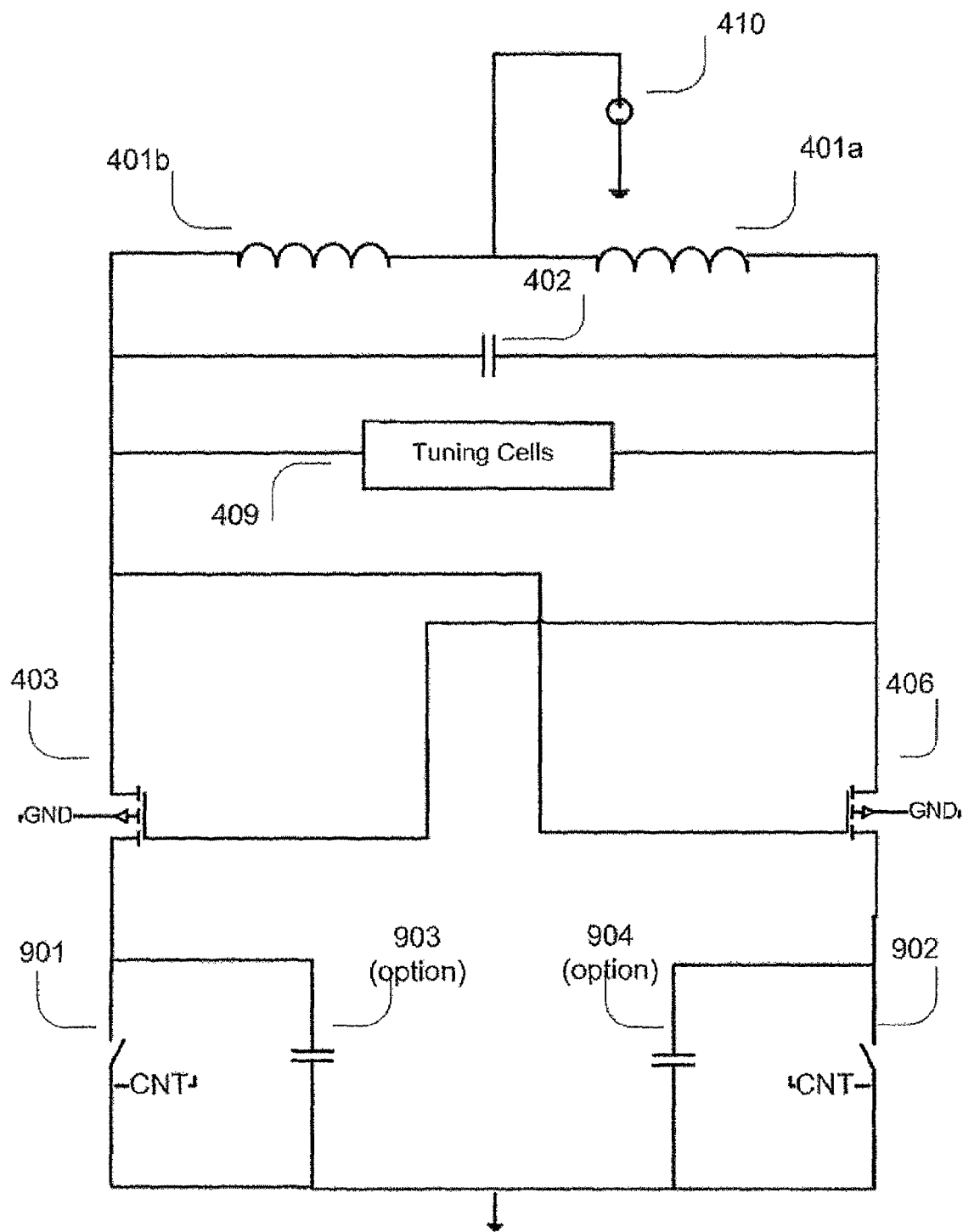
FIG. 9 is a schematic diagram of a first alternative embodiment of a pulse generator constructed and operational according to the teachings of the present invention.
Figure 10:
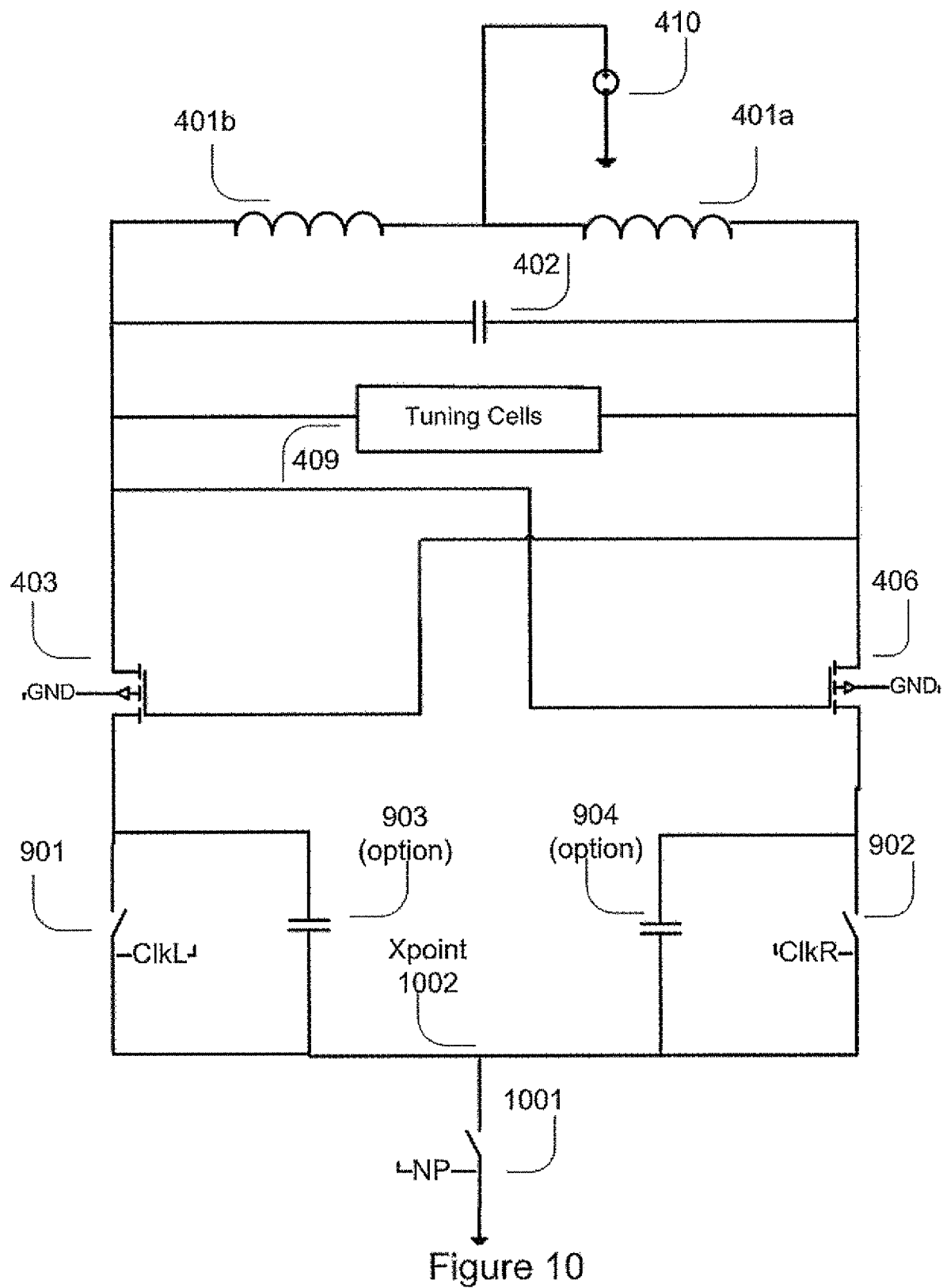
FIG. 10 is a schematic diagram of a second alternative embodiment of a pulse generator constructed and operational according to the teachings of the present invention.
Figure 13:
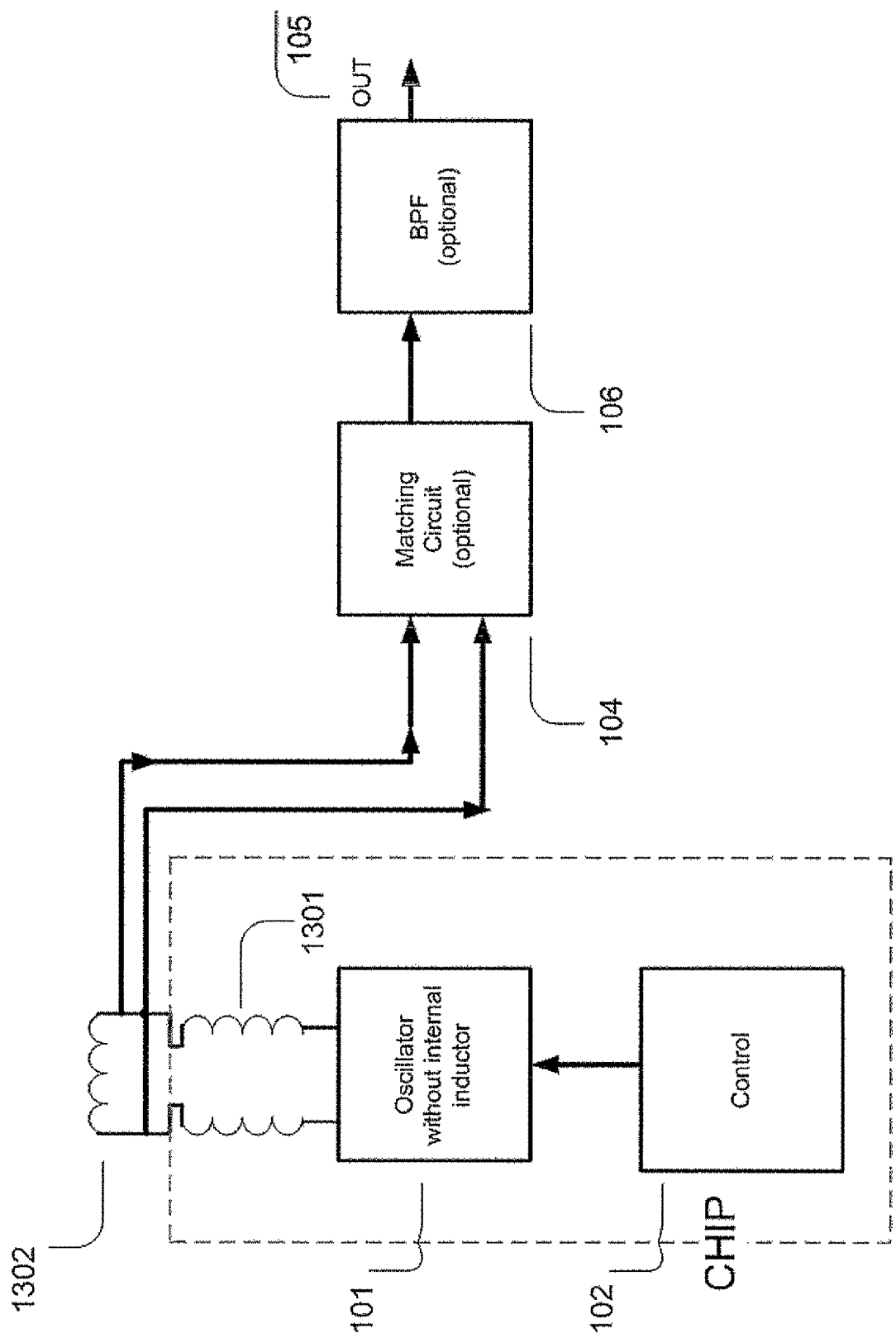
FIG. 13 is a schematic diagram of a third alternative embodiment of a pulse generator constructed and operational according to the teachings of the present invention.

FIGS. 9, 10 and 13 illustrate alternative embodiments of the present invention.

The first alternative embodiment of the present invention, as illustrated in FIG. 9, utilizes switches 901 and 902 that connect or disconnect the source of transistors 403 and 406, respectively, to GND. These switches control activation of their respective branch of the oscillator circuitry, thus switches on the gates are not necessary. As discussed with regard to the embodiment of FIG. 4, oscillation phase is determined by which branch is activated first, and the second branch is activated after half an oscillation cycle delay for the duration of the pulse.

This topology can provide a higher frequency of oscillations because of decreasing the parasitic capacitance on the oscillator nodes (no switches). In addition, the resistance of the switch, which can reduce the output power, is eliminated.

The disadvantage of this topology is that there is no strong connection to GND because of the resistance of switches 901 and 902. In order to reduce these resistances, 901 and 902 should be implemented using relatively big transistors. Such big transistors require a strong drive in the control logic in order to switch them quickly.

Some of the disadvantages noted above can be overcome by using capacitors 903 and 904 in parallel to the switches. The switches 901, 902 are bypassed by the capacitors 903 and 904 since the capacitors impedance for RF frequency can be made very low, and by this the resistance of the switches can be ignored. Still, switches 901 and 902 need to have sufficiently low resistance in order to discharge the capacitor fast enough.

FIG. 10 illustrates a variant of the first alternative embodiment above. Here, an additional switch to GND 1001 is added.

Although this increases the total resistance to GND, a perfect differential point (Xpoint 1002) enables low losses from this switch. In this embodiment, switch 901 (for example) is closed some time before the pulse generation. The pulse starts when switch 1001 is closed, and switch 902 will be closed half an oscillation cycle afterwards. The advantage of this topology is that pulse timing is controlled only from one signal, the signal that controls switch 1001, thus pulse timing, and thereby pulse phase, can be more accurate.

Another option, which is not illustrated in the drawings but can be applied to most topologies of the present invention, is to activated only one branch, and oscillations rely only on one transistor (either 403 or 406). Oscillations are achieved in such an option by relying on the mutual inductance between the two branches of the inductor 401*a* and 401*b*, which provides the signal to the gate of the transistor. It should be noted that the inductor may be implemented as a central tap inductor type. In this option, the circuit that provides the controls with appropriate half an oscillation cycle delay can be avoided in expense of power generated.

It will be appreciated that the pulse generator of the present invention is designed for use with VLSI technology, so the size of the internal inductor of the oscillator may very significant with respect to the chip area.

A second alternative embodiment of the present invention, in which the topology is designed without an internal inductor of the oscillator and without the TX amplifier which enable a decrease the chip area, is illustrated in FIG. 13. Here, instead of using an internal inductor, a bond wire 1301 can be used as an inductor. Alternatively, an external inductor 1302 can be used. The disadvantage of not using TX amplifier is that it will not protect the pulse generator from changing load.

It will be appreciated that the above descriptions are intended only to serve as examples and that many other embodiments are possible within the spirit and the scope of the present invention.

What is claimed is:

1. A method for producing a high power Radio Frequency pulse for a very short duration, the method comprising:
    (a) providing an oscillator having a symmetric topology;
    (b) activating a first branch of a differential pair of branches of said symmetric topology for a short duration by switching a connection to ground so as to break circuit symmetry and thereby create a large asymmetry in initial voltages;
    (c) activating a second branch of said symmetric topology by switching a connection to ground to begin oscillations; and
    (d) deactivating at least one of said first branch and said second branch to terminate oscillations,
    wherein the very short duration of the Radio Frequency pulse is approximately 1 nanosecond.

2. The method of claim 1, wherein said oscillator is implemented having a cross coupled oscillator topology.

3. The method of claim 2, wherein at least one of said activating said first branch and said activating said second branch includes closing at least one switch associated with at least one of said first branch and said second branch.

4. The method of claim 1, wherein said deactivating includes opening at least one said switch associated with at least one of said first branch and said second branch.

5. The method of claim 1, further including controlling a bandwidth of the Radio Frequency pulse by modifying a duration of oscillator activation.

6. The method of claim 1, further including providing at least one inductor and at least one capacitor such that said oscillator is based on resonance of said at least one inductor and said at least one capacitor.

7. The method of claim 6, wherein said at least one capacitor is implemented as a parasitic capacitor.

8. The method of claim 6, wherein said inductor is implemented using chip bond-wires.

9. The method of claim 1, further including selecting on which one of said first branch and said second branch to create said asymmetry and thereby allow for bi-phase modulation.

10. The method of claim 1, further including consuming power only for a duration of the Radio Frequency pulse, which is achieved by not using a reference current to operate said oscillator.

11. The method of claim 1, further including implementing all components in a single VLSI circuit.

12. A high power Radio Frequency pulse generator for generating a high power Radio Frequency pulse for a very short duration, the pulse generator comprising:
    (a) an oscillator having a symmetric topology;
    (b) at least a first switch with a connection to ground configured in a first branch of a differential pair of branches of said symmetric topology; and
    (c) at least a second switch with a connection to ground configured in a second branch of said differential pair of branches of said symmetric topology; wherein closure of one of said first and said second switches breaks a circuit symmetry of said symmetric topology so as to create an asymmetry in initial voltages of said differential pair of branches and subsequent closure of another of said first and said second switches begins oscillations and opening of at least one of said first and said second switches terminates oscillations,
    wherein the very short duration of the Radio Frequency pulse is approximately 1 nanosecond.

13. The pulse generator of claim 12, wherein said oscillator has a cross coupled oscillator topology.

14. A high power Radio Frequency pulse generator for generating a high power Radio Frequency pulse for a very short duration, the pulse generator comprising:
    (a) an oscillator having a symmetric topology;
    (b) at least a first switch configured in a first branch of a differential pair of branches of said symmetric topology; and
    (c) at least a second switch configured in a second branch of said differential pair of branches of said symmetric topology; wherein closure of one of said first and said second switches breaks a circuit symmetry of said symmetric topology so as to create an asymmetry in initial voltages of said differential pair of branches and subsequent closure of another of said first and said second switches begins oscillations and opening of at least one of said first and said second switches terminates oscillations;
    wherein said oscillator has a cross coupled oscillator topology; and
    wherein said first branch of said cross coupled topology includes at least a first transistor and said second branch of said cross coupled topology includes at least a second transistor and said first switch connects a gate of said first transistor to a drain of said second transistor and said second switch connects a gate of said second transistor to a drain of said first transistor and a third switch connects said gate of said first transistor to ground and a fourth switch connects said gate of said second transistor to ground.

15. A high power Radio Frequency pulse generator for generating a high power Radio Frequency pulse for a very short duration, the pulse generator comprising:
 (a) an oscillator having a symmetric topology;
 (b) at least a first switch configured in a first branch of a differential pair of branches of said symmetric topology; and
 (c) at least a second switch configured in a second branch of said differential pair of branches of said symmetric topology; wherein closure of one of said first and said second switches breaks a circuit symmetry of said symmetric topology so as to create an asymmetry in initial voltages of said differential pair of branches and subsequent closure of another of said first and said second switches begins oscillations and opening of at least one of said first and said second switches terminates oscillations;
 wherein said oscillator has a cross coupled oscillator topology; and
 wherein said first branch of said cross coupled topology includes at least a first transistor and said second branch of said cross coupled topology includes at least a second transistor and said first switch connects a source of said first transistor to ground and said second switch connects a source of said second transistor to ground.

16. The pulse generator of claim 15, further including two optional bypass capacitors that short the said first switch and said second switch.

17. The pulse generator of claim 15, further including a third switch that connects the sources of said first switch and said second switch to ground.

18. The pulse generator of claim 14, wherein the pulse generator is configured to operate by relying on mutual inductance between two branches of an inductor.

19. The pulse generator of claim 14, further including a control unit configured for controlling a bandwidth of the Radio Frequency pulse by modifying a duration of oscillator activation.

20. The pulse generator of claim 14, further including at least one inductor and at least one capacitor such that said oscillator is based on resonance of said at least one inductor and said at least one capacitor.

21. The pulse generator of claim 15, wherein said at least one capacitor is a parasitic capacitor.

22. The pulse generator of claim 15, wherein said inductor uses chip bond-wires.

23. The pulse generator of claim 14, further including a mechanism configured for selecting on which one of said first branch and said second branch to create said asymmetry and thereby allow for bi-phase modulation.

24. The pulse generator of claim 14, wherein no reference current is used to operate said oscillator, therefore, power is consumed only for a duration of the Radio Frequency pulse.

25. The pulse generator of claim 14, wherein all components are included in a single VLSI circuit.

26. The pulse generator of claim 15, wherein the pulse generator is configured to operate by relying on mutual inductance between two branches of an inductor.

* * * * *

UNITED STATES PATENT AND TRADEMARK OFFICE
CERTIFICATE OF CORRECTION

PATENT NO. : 8,427,242 B2  Page 1 of 1
APPLICATION NO. : 12/354108
DATED : April 23, 2013
INVENTOR(S) : Raphaeli et al.

It is certified that error appears in the above-identified patent and that said Letters Patent is hereby corrected as shown below:

On the Title page,
Item [73] Assignee: "Zebra Enterprises Solutions Corp." should read --Zebra Enterprise Solutions Corp.--.

In the Specifications:

Column 2,
Line 32, "RE pulses" should read --RF pulses--.

Signed and Sealed this
Seventeenth Day of September, 2013

Teresa Stanek Rea
*Deputy Director of the United States Patent and Trademark Office*